Patented Nov. 28, 1933

1,936,806

UNITED STATES PATENT OFFICE 1,936,806

PROCESS OF MAKING STRONTIUM CARBONATE

Otho L. Thomas, Maplewood, N. J., assignor to The Grasselli Chemical Company, Cleveland, Ohio, a corporation of Delaware No Drawing. Application November 25, 1931
Serial No. 577,395

1 Claim. (Cl. 23—66)

Strontium carbonate is commonly made by digesting celestite, natural strontium sulfate ore, with soda ash solutions at elevated temperatures.

This metathetical reaction involving the formation of a difficultly soluble material, strontium carbonate, from another difficultly soluble material, strontium sulfate, proceeds slowly and even after prolonged boiling of a slurry of celestite in aqueous sodium carbonate the insoluble contains substantial amounts of sulfate radical, present possibly as strontium sulfate and sodium sulfate. It is only after considerable digestion and washing with water that a strontium carbonate sufficiently free from sodium sulfate can be obtained.

I have found that the reaction between sodium carbonate and strontium sulfate proceeds rapidly and to substantial completion without occlusion of sodium sulfate if the material suspended in the reaction liquor is during reaction submitted to mechanical disintegration or attrition, and my invention consists in reacting with an alkali metal carbonate upon an aqueous slurry of strontium sulfate at elevated temperature in a grinding apparatus.

The attrition, or grinding, effect is conveniently obtained in a ball mill, a colloid mill, or other equivalent equipment in which the solid particles suspended in the reaction liquor are disintegrated in forced contact with solid surfaces which do not participate in the chemical reaction.

By this operation I am enabled to reduce the time of reaction to less than one-third of that usually required and instead of the 20 to 25 reslurrying and washing operations needed in previous processes to free the reaction product from sodium sulfate, I obtain an entirely satisfactory product in not more than two washings.

I am giving below a typical exemplification of how my novel process of reacting with sodium carbonate upon celestite under conditions of attrition has been successfully performed.

Celestite was, without drying, crushed to pieces about one-half an inch to one inch in diameter. Two tons of this crushed ore was charged into a steam jacketed ball mill of 2260 gallons capacity, containing approximately 13,200 pounds steel balls.

To this was added 2170 pounds soda ash dissolved in about 850 gallons of hot water and the temperature adjusted to 150 to 180° F. The ball mill was then run for about one hour at this temperature and its content emptied into a slurry tank equipped with an agitator from where it was then, still hot, pumped into a continuous vacuum filter from which a hot, strong solution of sodium sulfate was obtained. The cake was washed once with hot water (150 to 180° F.).

The cake of strontium carbonate discharged from the filter was reslurried with sufficient hot water to give a slurry containing about 30% solids. This slurry was returned into the above ball mill and run for an hour while steam was admitted into the jacket to maintain the charge above about 150° F. The slurry was again filtered as above and washed once with hot water.

The strontium carbonate obtained on a dry basis not more than 0.8% sodium as sodium sulfate and was sufficiently pure for any technical use.

This operation was performed in less than a day's time, which contrasts very favorably with the 20 to 25 days required for a complete cycle of decomposition, reslurrying and washing operations required when a finely ground celestite is decomposed with soda ash without grinding or attrition.

It is, of course, necessary to grind the ore when using a colloid mill in such operations and under such conditions two or three passages through such a mill, with possibly one intermediate separation of the insoluble from the sodium sulfate solution, will produce an entirely satisfactory strontium carbonate.

I claim:

The process of ball milling crushed celestite ore in a sodium carbonate solution at a temperature above about 150° F., separating the solid from the sodium sulfate solution produced, slurrying the solid with water, regrinding said slurry in a ball mill at a temperature above about 150° F. and separating the strontium carbonate produced from the reaction liquor.

OTHO L. THOMAS.